R. H. HEMPHILL.
PROCESS OF OBTAINING PURE LIQUIDS IN A FROZEN STATE.
APPLICATION FILED JAN. 6, 1920.
1,437,518.
Patented Dec. 5, 1922.
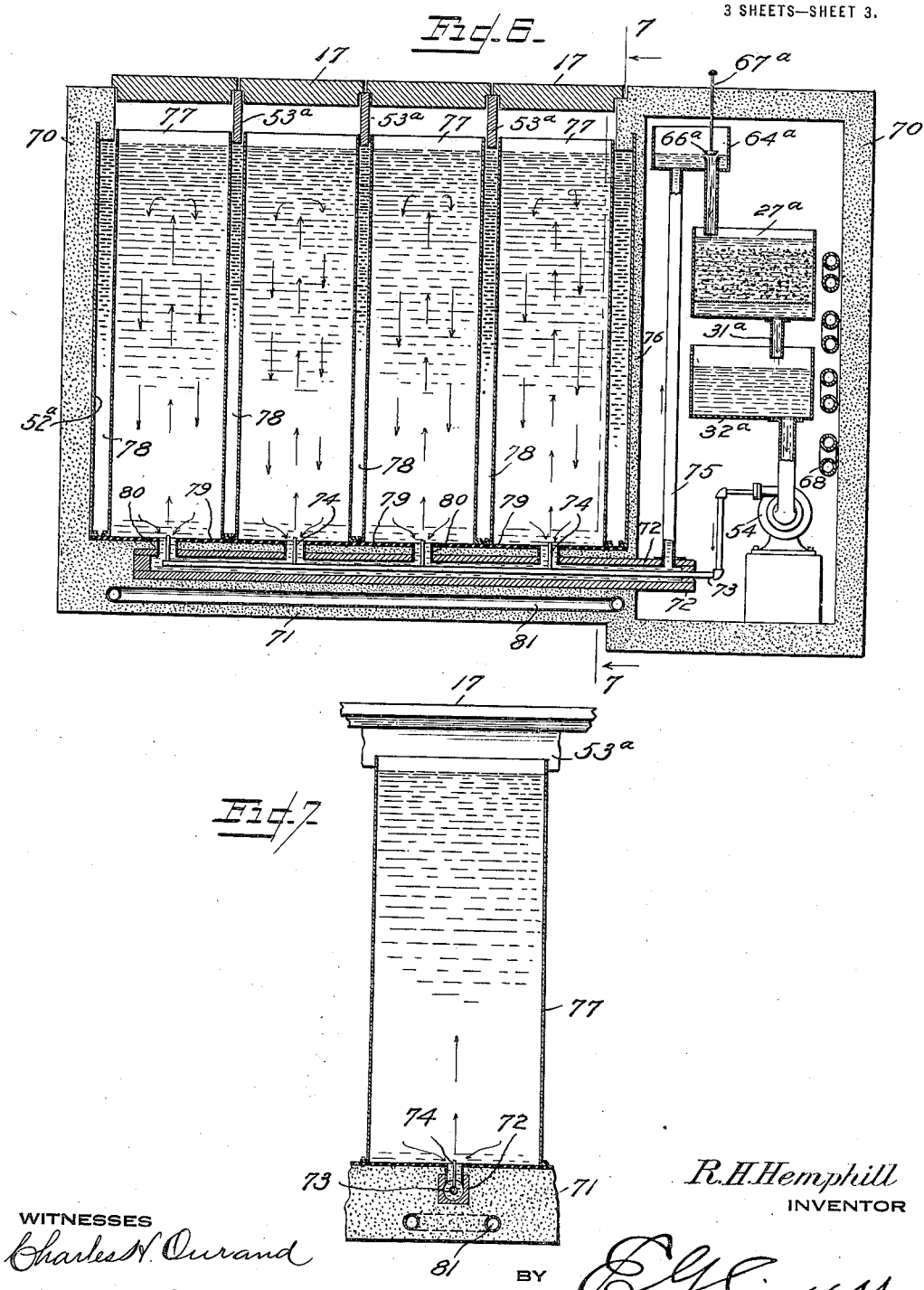

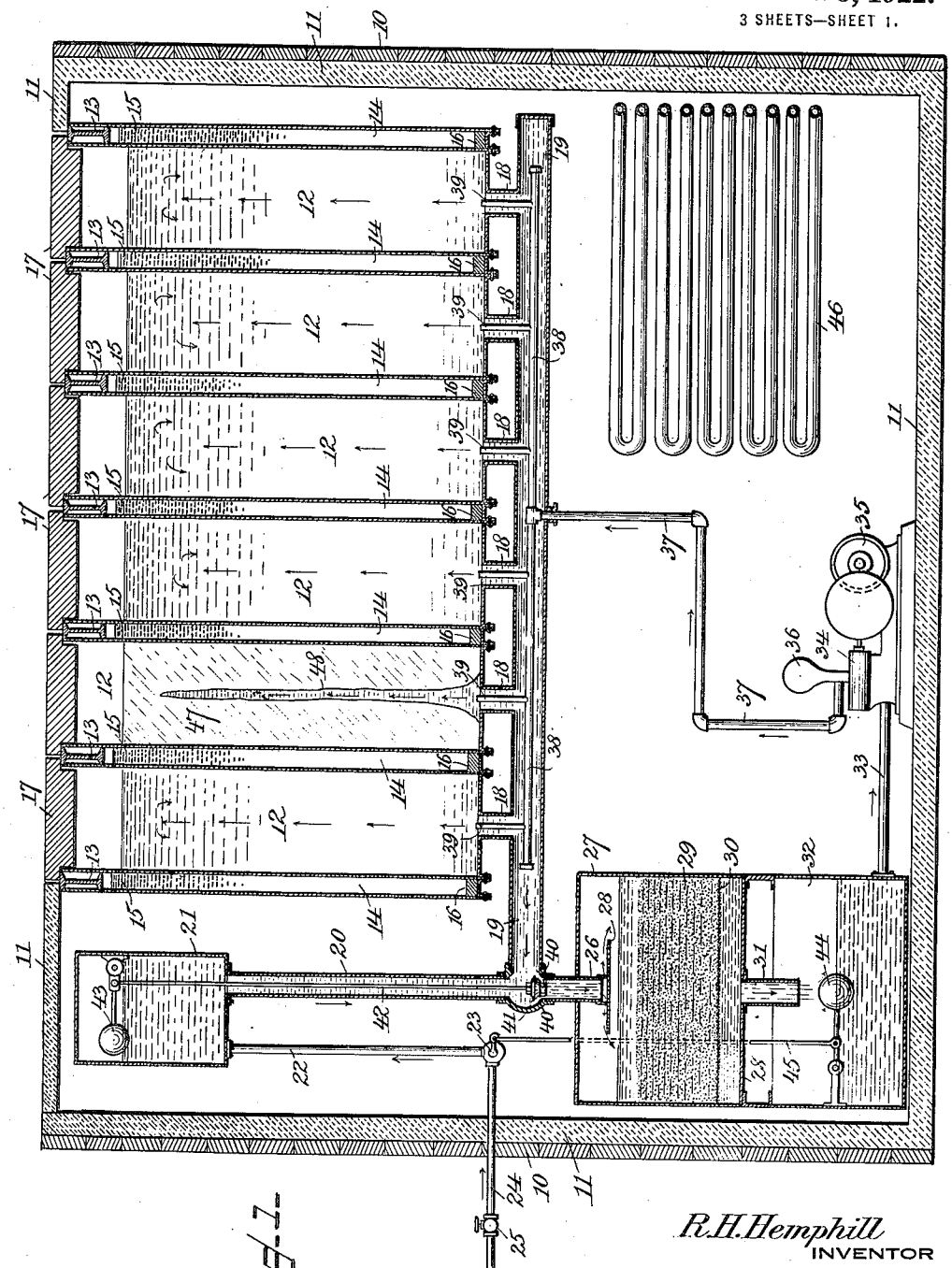

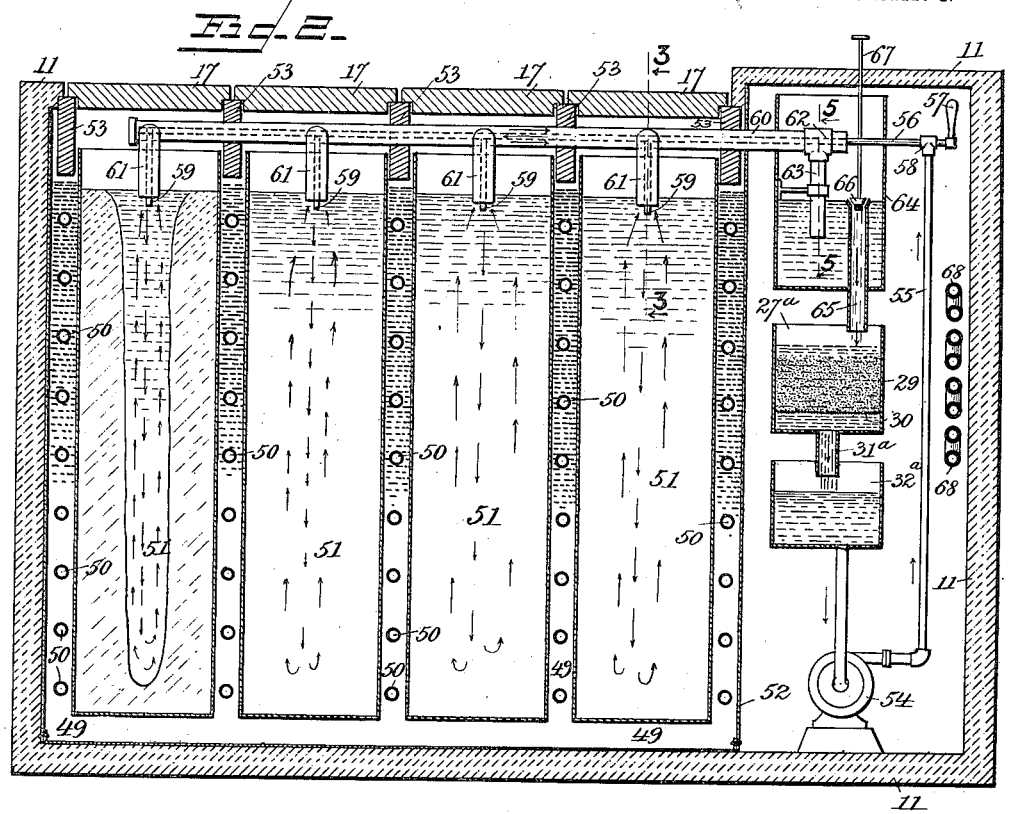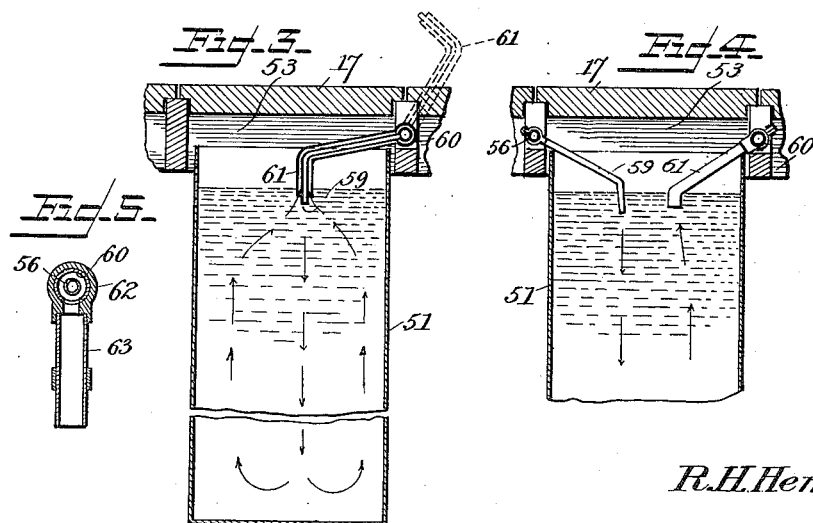

Patented Dec. 5, 1922.

1,437,518

UNITED STATES PATENT OFFICE.

ROBERT H. HEMPHILL, OF CHARLESTON, SOUTH CAROLINA.

PROCESS OF OBTAINING PURE LIQUIDS IN A FROZEN STATE.

Application filed January 6, 1920. Serial No. 349,779.

*To all whom it may concern:*

Be it known that I, ROBERT H. HEMPHILL, a citizen of the United States, residing at Charleston, in the county of Charleston and State of South Carolina, have invented a new and useful Process of Obtaining Pure Liquids in a Frozen State, of which the following is a specification.

This invention relates to refrigerating processes, and one object is to provide pure ice from raw water, whatever the quality of the water.

In the past, when ice of a high degree of purity was desired, it has always been considered necessary to manufacture the same from distilled water, for the reason that raw water free from impurities, coloring matter, dissolved gases or disease-breeding bacteria is seldom if ever available. Because of its nature, the can system of making ice has, notwithstanding the expense, commonly employed distilled water. Where reasonably pure raw water was to be had, the plate system was resorted to and agitation of the water was depended upon to reduce below the point of visibility the effects of such impurities as iron salts, and vegetable organic matter, which give discoloration, alkaline carbonates and sulphates, which produce cloudiness, and dissolved air, or other gases which produce opaque ice.

Of recent years attempts have been made to combine the advantages of each system, as for example, to adapt the agitation feature of the plate system to the can system and use raw water for the latter. The agitation is accomplished either by a mechanical stirring device, by a refrigerated air jet which agitates the water by ebullition, or by a reciprocating water piston. The water piston is produced by inserting small pipes into the water-filled cans, connecting them to a header, and by means of a pump alternately withdrawing and returning a small amount of water forcibly to each can. The agitation is continued until the ice-cake is frozen to a point where the core consists of a quantity of visibly discolored water. This unfrozen water is then withdrawn from the can and the cavity is either refilled with fresh water or left unfilled.

Even these improved ice-making systems fail to produce pure ice. Indeed, up to the present time no process has been devised, to my knowledge, which can be relied upon to turn out solid cakes of transparent ice free from all impurities. The reason for this, in my opinion, is that ideal conditions for the formation of ice have heretofore never existed in artificial ice-making apparatus. If such conditions prevailed, ice would invariably be made free from all impurities from any raw water containing impurities in suspension or in solution, in a practical ice plant.

It is within the province of my invention to provide a method of manufacturing ice from raw water which will create ideally perfect conditions within a practical ice-making system, whereby pure ice may be made from raw water without pre-treatment of the same.

The present invention, in its broadest aspect, relates to the separation of liquids from dissolved or suspended matter by the process of congealment and sedimentation under practically ideal conditions, so that the solvent and solute and suspended matter are separated and either or both may be recovered if desired. Inasmuch as the process, by my invention, of separating any solvent from its contained matter by congealment and sedimentation, whether the result desired be the recovery in frozen form of the solvent, or the separation and recovery of the contained matter, is substantially identical with the principal steps in the manufacture of ice, it is deemed sufficient to describe the process as related to the latter only.

The invention will be best comprehended from a consideration of the following detailed description taken in connection with the accompanying drawings, forming part of this specification. The drawings illustrate, diagrammatically, apparatus which will be found useful either in ice-making or in liquid separation without essential modification. It should be understood, however, that the invention is not limited by the showing of the drawings, but may be used in connection with apparatus differing widely therefrom. For the actual scope of the present invention, one must look to the appended claims.

In the drawings,

Fig. 1 represents, diagrammatically, a vertical section of the ice-making or liquid-separating chamber of a plant which may be used to carry out the improved process forming the subject of the present invention;

Fig. 2 is a similar view of a similar chamber having a different arrangement of apparatus;

Fig. 3 is a cross section on the line 3—3 of Fig. 2;

Fig. 4 is a detail cross-section illustrating a construction of a part of the apparatus shown in Fig. 2;

Fig. 5 is a detail view, showing a slight modification of a part of the apparatus shown in Figs. 2 and 3;

Fig. 6 is a vertical section of a chamber having a further modified arrangement of apparatus;

Fig. 7 is a section on the line 7—7 of Fig. 6.

The drawing shows, in Fig. 1, one form of ice plant, or separating apparatus, so constructed as to fulfill the aims of the present invention. This ice plant or apparatus is contained in an insulated chamber comprising walls 10 which may be of wood, and inner walls 11 which may be of any insulating material. The insulation extends around the four walls and bottom of the chamber as well as some parts of the top thereof.

Enclosed within the insulated compartment are a plurality of fixed cans or tanks 12 in which the water is to be frozen. These tanks are fixed permanently to I-beams or the like 13. Surrounding each tank is a space 14 in which brine 15 will circulate. The brine 15 is refrigerated by ammonia coils (not shown). The bottoms of the spaces or brine passageways 14 are closed preferably by asphaltum seals 16. Each can has a cover 17 which rests upon the adjacent I-beam and may be removed at pleasure.

Connected with the bottom of each can or tank is a nipple 18, all the nipples being connected at their opposite ends with a header 19. The header is closed at one end, and at the opposite end is connected with a pipe 20, which in turn is secured to a water level controlling chamber 21. Another pipe 22 conducts water to the chamber 21, and has a valve 23 at its opposite end. A water inlet pipe 24 connects with the pipe 22 by means of the valve 23. The pipe 24 conducts water from the outside into the system, and is provided with a cut-off valve 25 outside of the ice-making compartment whereby the supply of water may be shut off without going into the compartment.

The header 19 is also provided with a discharge pipe 26 leading downwardly therefrom at that end to which the pipe 20 is attached. The discharge pipe 26 leads into a filter 27. The lower end of the discharge pipe has a spreader plate 28 attached thereto, whereby the water is sprayed more or less evenly over the surface of the filter bed. The latter may consist of fine gravel and sand, as indicated at 29, with a screen 30 beneath the said plate.

The liquid from the filter bed is discharged by means of a pipe 31 into a storage tank 32. Connected with the storage tank is a pipe 33 which is also connected to a pump 34 of any desired type. The pump 34 is driven by a motor 35 or the equivalent and has an air dome 36. While, for the sake of clearness of illustration, the motor has been shown as directly connected with the same base as the pump 34, in practice I prefer to place the motor, or whatever power unit is used to drive the pump, outside of the ice-making compartment. This will effect a considerable saving in refrigerating units. In all cases, however, the pump will be placed within the insulated compartment, as the drawings show.

A lead-off pipe 37 conducts water from the pump to a feed header 38 contained within the header 19. The feed header 38 has a series of injecting or feed pipes 39, of relatively small diameter, which are passed through the nipples 18 into the lower ends of the tanks or cans 12.

A valve seat 40 for a valve 41 is provided where the discharge pipe 26 is connected with the header 19, and a valve rod 42 connected with the valve 41 at one end is made fast to a float 43 secured within the chamber 21. It will be clear that as the water level in the chamber 21 rises, the valve 41 will be lifted from its seat, allowing water to discharge through the pipe 26 into the filter below.

The storage tank 32 is provided with a float 44 controlling a rod 45 whose upper end is connected with the valve 23. Thus, as the float 44 rises, the valve 23 will be closed, while when the level in the storage tank falls below a certain point, fresh water will be admitted into the system.

A series of brine coils 46 is placed in the lower part of the compartment. The function of these brine coils is to control the temperature of the water in the filter bed, storage tank, pump and connecting pipes at a point equal to or less than the freezing point. The arrangement is such that as the water passes from the header 19 into the filter bed, it at no time rises above its freezing point, whereby it will have no tendency to redissolve impurities held in suspension or in pseudo-solution, but on the contrary will make every effort to deposit them in the filter where conditions are favorable. The brine coils are of sufficient refrigerating capacity to never allow the temperature of any portion of the system through which the water circulates to rise above the normal freezing point, but on the contrary to keep the temperature considerably below that point, if desirable. Therefore, as the water comes from the header 19 to the filter bed, it is in such condition as to deposit practically all the matter discarded by the freezing ice. After being thus purified, it goes to the storage tank and through the pump, which, however, being itself refrigerated, returns the water into the cans 12 at a temperature not above 32° F.

When water is first admitted to the system, it runs through the pipes 24 and 22 into the header 19 and up into each of the tanks or cans 12 until the level of the same reaches a predetermined point. When this point has been reached, the float 43 will rise, thus lifting the valve 41 and allowing water to discharge into the filter. From there water will go into the storage tank, then to the pump and through the connecting pipe, back into the cans again, when the entire system will be filled with water and the float 44 will rise to automatically cut off the water supply by means of the valve 23. As the brine circulates through the spaces 14, it freezes the water in all of the cans in the manner indicated in Fig. 1, in which a cake of ice 47 is shown having an unfrozen cavity 48. The water is kept in constant circulation by the pump, the injecting pipes 39 directing the water in the form of jets into each of the cans. An equal amount of water constantly passes out of each can by gravity through the nipples 18 and then moves through the header 19 past the valve 41 and into the filter. This movement of the water keeps up until solid cakes of ice are formed in each can, when the pump will be stopped and the ice cakes withdrawn from the freezing receptacles in the well known manner.

In Fig. 2, a system similar in many respects to that shown in Fig. 1 is depicted, but in this system the brine spaces 49 have ammonia coils 50 therein, and tanks or cans 51 there used are of the removable type. A steel tank 52 is provided, into which the cans 51 and ammonia coils 50 are placed. Cross beams 53 are provided at the top of the compartment, upon which the covers 17 rest and between which the removable cans 51 are set.

In this arrangement, a pump 54, which may be of the centrifugal type, is connected by means of a pipe 55, with a feed header 56 having a crank 57 at one end whereby it may be turned on its axis. A valve 58 connects the pipe 55 with a feed header 56, the arrangement being such that when the feed header 56 is turned by means of the crank 57, the valve 58 will be closed or opened as the case may be. The feed header 56 has a series of injecting pipes 59 feeding into the cans 51, whereby water under pressure from the pump is introduced into the cans to bring about the desired agitation and circulation of the same.

A header 60 secured to the feed header 56 and surrounding the same is mounted above the cans 51, preferably being supported by the cross beams 53. The header 60 has siphon pipes 61 which are placed in a surrounding relation to the injecting pipes 59 and have a somewhat shorter length than the same. A valve 62, shown in detail in Fig. 5, is provided near one end of the header whereby connection may be made between the same and a fixed discharge pipe 63.

When the crank 57 is turned to move the feed header 56, it will also turn the header 60 on its axis, thereby lifting or lowering the siphon pipes 61 into or out of the cans, the respective positions of the same being indicated by dotted and full lines in Fig. 3. This movement of the concentric headers will close or open the valves 58 and 62 simultaneously. Thus the circulation of the water through the system is controlled by proper movements of the crank 57, turning in one direction lifting the siphon pipes 61 out of the cans and shutting the valves 62 and 58, while turning in the opposite direction opens these valves and lowers the siphon pipes.

The discharge pipe 63 is secured within a tank 64. This tank has a pipe 65 leading off through the bottom thereof and having its upper end at that distance above the bottom of the tank at which it is desired the level of the water in the system to stand. This overflow pipe 65 has a valve 66 controlled by a handle 67. When the water is circulating through the system, this valve 66 will be lifted off its seat in the upper end of the overflow pipe 65, thus allowing the water to be maintained at the proper level in the cans while subjected to a constant circulation. The lower end of the discharge pipe 65 leads the water into a filter 27ᴬ similar to the filter 27 previously described. The water goes from the filter 27ᵃ through a pipe 31ᵃ, into a tank 32ᴬ which acts as a reservoir. Brine coils 68 are provided within the filtering compartment to refrigerate the pump, filter and circulating pipes, whereby the water from the moment of withdrawal from the cans to its return never rises above a temperature of 32° F.

In Fig. 4 a slightly different arrangement of the injecting siphon pipes is shown. Here the injecting pipe 59 is not surrounded by the siphon pipe 61 but is independently pivoted. A separate crank for the feed header 56 for turning the discharge header 60 will be provided, the arrangement being otherwise exactly the same as shown in Fig. 2.

The arrangement of apparatus in Fig. 6 is like that of Fig. 1 in employing stationary cans supplied with circulating water from below, and is like the arrangement of Fig. 2 in the disposition of water level controlling tank, the filter, the storage tank and the pump. Here the apparatus is contained within a chamber having walls 70 of cork or the like with a bottom wall 71. A metal tank 52ª similar to the metal tank 52 is secured within the insulating walls, being bolted to a non-conducting bottom 79 of hard rubber or the like. The cans 77 are also secured to said bottom and to beams 53ª and have brine spaces 78 surrounding the same.

The bottom wall 71 receives a wooden header 72 which is connected by a pipe 75 with the water-leveling tank 64ª. Disposed within the wooden header 72 is the feed header 73 having a series of injecting or feed pipes 74, one for each can. Short pipe sections or nipples 80 connect the bottoms of the ice freezing cans or containers with the header 72.

A section 76 of the insulating material is provided upon the outside of the tank 52ª between said tank and the filtering and pumping apparatus. This insulation prevents the brine in the passageways 78 from interfering with the regulation of the temperature desired in the filter chamber. Brine coils 68 are provided in the filtering compartment whereby the temperature of the apparatus contained therein may be kept at or below the normal freezing point. The under wall of the compartment is provided with brine coils 81 embedded therein through which refrigerated brine is circulated to control the temperature of the whole area in which the water circulating piping is embedded and to prevent any heat which may leak upward through the foundation from reaching the water in transit between the ice forming cans and the filtering chamber.

Thus it is seen that extraordinary provision is made to preserve the temperature of the unfrozen liquid at a fixed point. It will be impossible for water circulating through this apparatus to exhibit rapid fluctuations in temperature, and in fact its temperature through the necessary cycle of operations may be regulated within small fractions of the temperature desired at any given point. If preferred, the unfrozen liquid may be maintained at temperatures considerably below its normal freezing temperature.

The principal feature of my invention is that the water, while being frozen, is kept in constant circulation, and in the course of the circulation the water is also constantly filtered under ideal conditions to wit: at or below its normal freezing temperature, thus removing all matter thrown off by the freezing process, the result being clear and uncolored ice with a degree of purity hitherto unknown in artificial ice. The whole of the system is contained in an insulated room in which the temperature is maintained at or below 32° F., so that the water, while passing through the filter and pump, does not pick up any heat but is jetted back into the cans containing only the latent heat of fusion, to be removed by the refrigerating brine.

It has been determined that in the process of freezing at atmospheric pressure, only molecules of pure water will freeze at 32° F. It has also been determined that foreign matter, whether held in suspension or in solution, is normally thrown out in the freezing process, and under favorable conditions, such as exist in the system under consideration, is easily removed by proper filtration so long as the temperature of the water remains at 32° F.

In the process of commercially making pure ice, especially in the can system, the unfrozen solution contained in the freezing receptacle must dispose in some way of the foreign matter which is being continuously discarded by the freezing ice; otherwise said matter will accumulate upon the surface of the freezing ice, interfering with the freezing process and eventually being mechanically imprisoned in the forming ice.

I have discovered that the unfrozen portion of the liquid, while remaining at the freezing temperature, will accept and hold in a state of suspension, a certain amount of matter discarded by the freezing molecules. Toward such matter the unfrozen liquid exhibits no particular affinity but rather a tolerance for a limited quantity which varies with the nature of the matter. Furthermore, so long as the unfrozen liquid remains at the freezing temperature, if proper sedimentation or filtration apparatus be introduced into the system, the unfrozen liquid will deposit its suspended or pseudo-dissolved content.

If however, the temperature of the unfrozen fluid be allowed to ascend before sedimentation or filtration, or before the suspended or pseudo-dissolved matter is otherwise deposited, the unfrozen liquid will not deposit such matter but will hold or even redissolve it.

If however, no sedimentation or filtration or equivalent apparatus be provided, a point of saturation is soon reached at which the unfrozen liquid refuses to further accept the matter discarded by the freezing molecules, whereupon coagulation upon the freezing surface of the ice occurs, interfering with the freezing process and eventually being imprisoned in the freezing ice.

If freezing is to be carried on at a rapid rate, it is necessary to provide agitation in order that the immediate zone of the freezing operation may be supplied with liquid undersaturated with discarded matter, but agitation will only serve to assist in the production of pure ice up to the point that the whole of the unfrozen liquid becomes saturated and resists the intrusion of a greater quantity of discarded matter.

As the action of liquid along a solid is a rolling and not a sliding motion, and as at the zone of contact there is no motion whatever, after the unfrozen liquid becomes wholly saturated and resists the intrusion of further discarded matter even violent agitation will serve to remove forcibly, only such proportion of the accumulating masses of discarded matter as project beyond the zone of no motion, and the masses of such matter as remain within the zone of no motion or slight motion will be mechanically imprisoned in the forming ice.

As the amount of heat removed by the contents of the ice-forming receptacle by the refrigerant decreases in the proportion as the square of the thickness of the ice cake increases, it is evident that if a portion of the unfrozen contents of the ice-forming receptacle be continuously or even frequently removed, and a fresh equal supply of liquid of higher temperature introduced, a point will soon be reached at which the amount of heat introduced in a given time will equal the amount removed by the refrigerant, whereupon the freezing operation will cease. This is an objectionable feature of all raw water ice-making systems known to me. If the contents of the ice-forming receptacle are to be wholly congealed, the replacement of any portion of the contents removed continuously or intermittently, must be made at the freezing point.

It will therefore be evident, that to produce pure ice, it is necessary that the unfrozen liquid be maintained in an unsaturated state in which it will tolerate the intrusion of matter discarded by the freezing ice. That to maintain the unfrozen liquid in such a favorable condition it must be continuously or frequently induced to deposit a portion of its suspended content, outside the freezing receptacle. That to induce such deposit the unfrozen liquid must remain at or substantially at or below the normal freezing temperature, and that to completely congeal the contents of the freezing receptacle if a portion of the unfrozen content be removed, it must be returned at or below the normal freezing temperature.

The present process is designed to remove from the freezing receptacle, either continuously or intermittently, a portion of the unfrozen contents, and while maintaining the temperature of the liquid so removed at or below its normal freezing point, to induce it to deposit its suspended or pseudo-dissolved matter and thereafter returning it to the freezing receptacle at below its normal freezing point. Were a portion of the unfrozen contents continuously or frequently removed and returned to the receptacle at a higher temperature, the freezing operation would cease before complete congealment, as has been pointed out above.

It is evident that other forms of apparatus may be employed to produce the results herein claimed, and that the process may be applied to a wide variety of useful and necessary operations, other than ice-making, wherein a fluid is desired to be separated from its suspended or dissolved contents. Therefore, I do not wish to be limited to making ice by the process claimed. For instance, the process could be employed in the separation of the solid matter in milk by freezing the water and removing the solid matter therefrom.

The word "impurities" as here used includes all solutes whether solids, liquids or gases, and all suspended matter, as well as all other matter not a component part of the pure solvent and hence not forming a part of the pure crystals of the frozen liquid.

In the present specification the term "freezing point" has been employed. By this is meant the temperature at which the pure liquid will freeze or crystallize under standard conditions when in contact with a crystal of its solid. In other words "freezing point" is considered to mean the normal freezing temperature, that point at which a solid and a liquid obtained by melting of the solid may exist side by side in contact without the matter in either state passing or tending to pass over into the other state.

What is claimed is:—

1. The process of obtaining pure liquids in a frozen state, which consists in inducing freezing of the liquid in a portion of a system, circulating the liquid while being refrigerated, filtering the liquid during the course of its circulation, and maintaining the liquid throughout the process at a temperature not exceeding its normal freezing point.

2. The process of obtaining pure liquids in a frozen state, which consists in inducing freezing of the liquid in a portion of a system, maintaining a constant circulation of the liquid in said system, mechanically removing matter discarded by the freezing liquid during such circulation, and holding the temperature of the liquid at or below its normal freezing point throughout the process.

3. The process of obtaining pure liquids in a frozen state, which consists in placing the liquid into a container in contact with an active refrigerant, circulating the liquid through said container and out of the same, filtering the liquid while outside the container and at or below its normal freezing temperature, and returning the liquid to the container at or below its normal freezing temperature.

4. The process of obtaining pure liquids in a frozen state, which consists in placing the liquid into a freezing container, circulating the liquid through said container and out of the same, filtering the liquid while outside the container and at or below its normal freezing temperature, and returning the liquid to the container at or below its normal freezing temperature, the return of the liquid serving to agitate the liquid within the container.

5. The process of obtaining pure solvents in a frozen state, which consists in running the liquid in its natural state into a freezing receptacle, setting up and continuing a freezing operation within the receptacle, maintaining a circulation of the liquid within the receptacle, continuously filtering the liquid, and returning the filtered liquid to its receptacle, the liquid in its passage to and from the filter being maintained at a temperature not above its normal freezing point.

6. The process of obtaining pure solvents in a frozen state, which consists in circulating the liquid through a freezing receptacle, continuously withdrawing unfrozen liquid from said receptacle, filtering such withdrawn portion, and returning an equal quantity of filtered liquid to said receptacle, the liquid being held at or below its normal freezing temperature during the entire period intervening between its withdrawal and return.

7. The process of obtaining pure solvents in a frozen state, which consists in introducing a quantity of liquid into a freezing system, pumping the liquid through said system, refrigerating the liquid throughout its course through said system, and constantly removing contained matter thrown off by the liquid as it freezes, the liquid being maintained at or below its normal freezing temperature throughout the process.

8. The process of obtaining pure water in a frozen state, which consists in introducing a quantity of raw water into a freezing recepatcle, maintaining a constant level in the same, setting up and continuing the freezing operation within the receptacle, continuously removing from the receptacle a portion of its unfrozen contents, inducing sedimentation in such removed portion to cause the deposit of the matter discarded by the freezing operation, returning the removed portion to the receptacle after it has been freed of such matter, causing agitation of the liquid within the receptacle by the return of the removed portion, and maintaining the temperature of the removed portion at or below the normal freezing point during the entire period intervening between its removal from the receptacle and its return thereto.

9. The process of obtaining pure solvents in a frozen state, which consists in introducing the liquid into a freezing container, circulating the liquid through said container, withdrawing the unfrozen part of the liquid from the container and filtering it outside the container, returning the filtered liquid to the container and agitating the liquid therein, the liquid being maintained at or below its normal freezing temperature during the entire process, and continuing these steps until the liquid in the container is completely frozen.

10. Apparatus for obtaining pure liquids in a frozen state, including a refrigerated container, a refrigerated filter, refrigerated conduits joining the inlet and outlet sides of the filter with the container, and means adapted to circulate a liquid through the system, whereby the liquid introduced into the apparatus and circulated therethrough is brought down to its normal freezing point and thereafter maintained at temperatures not above that point.

11. Apparatus for obtaining pure liquids in a frozen state, including a refrigerated container, a refrigerated filter, refrigerated conduits joining the filter and container, and a refrigerated pump connected to the conduit leading from the outlet of the filter, whereby a liquid introduced into the apparatus is circulated therethrough and is brought down to its normal freezing point and maintained at temperatures not above such point.

12. An apparatus for obtaining pure liquids in a frozen state consisting of a receptacle for the freezing liquid, a filter, and conduits connecting the filter and receptacle to provide for a complete circulation of the liquid from the receptacle to the filter and back again, means for introducing liquid into the receptacle, means for refrigerating the receptacle to congeal the liquid therein, means for maintaining the liquid as it leaves the receptacle and enters the filter and as it passes back to the receptacle again at a temperature at or below the normal freezing point.

13. An apparatus for depositing solid matter from liquids by refrigeration and sedimentation, consisting of a receptacle to contain the liquid to be frozen, means for introducing the desired quantity of liquid into said receptacle and maintaining a constant level of the same, controllable means for refrigerating said receptacle and contents, means for agitating the liquid contents of the receptacle during the freezing process, means for continuously removing from said receptacle a portion of the unfrozen contents, means for introducing the removed portion of the unfrozen liquid into a filter so as to deposit the matter discarded by the freezing operation, means for returning the removed portion to the receptacle after it has been freed of such matter, and means for controlling the temperature of the removed portion during the complete cycle of operations intervening between its removal from the said receptacle and its return thereto.

14. An apparatus for separating solid matter from liquids by refrigeration and sedimentation, consisting of a receptacle to contain the liquid to be frozen, means for introducing the desired quantity of liquid into said receptacle and maintaining a constant level of the same, controllable means for refrigerating said receptacle and contents, means for agitating the liquid contents of the receptacle during the freezing process, means for continuously removing from said receptacle a portion of the unfrozen contents, means exterior to the receptacle for causing the deposit of the matter discarded by the freezing operation, means for returning such removed portion back to the receptacle after it has been freed of its foreign matter, and means for controlling the temperature of the removed portion during the entire period from its removal from the receptacle and its return thereto.

15. An apparatus for separating solid matter from liquids by refrigeration and sedimentation, consisting of a receptacle to contain the liquid to be frozen, means for introducing the desired quantity of liquid into said receptacle and maintaining a constant level of the same, controllable means for refrigerating said receptacle and contents and maintaining said receptacle at a temperature below the freezing point, means for removing from said receptacle a portion of the unfrozen contents, means exterior to the receptacle for causing the deposit of the matter discarded by the freezing operation, means for returning such removed portion to the receptacle after it has been freed of such matter, said means producing an agitation of the liquid within the receptacle, and means for controlling the temperature of the removed portion during the entire period from its removal from the receptacle and its return thereto.

16. An apparatus for obtaining pure liquids in a frozen state, consisting of a receptacle for the liquid, a filter, a pump, and conduits connecting the filter, pump and receptacle to provide for a complete circulation of the liquid from the receptacle to the filter and back again, means for introducing liquid into the receptacle and maintaining a constant level of the same, means for refrigerating the receptacle to congeal the liquid therein, means for agitating the liquid contents of the receptacle during the freezing process, and means for maintaining the liquid throughout its course from the receptacle into and through the filter to the pump, and back to the receptacle, at a temperature at or below the normal freezing point, by enclosing the entire apparatus within an insulated chamber provided with refrigerating means.

17. An apparatus for separating solid matter from liquids by refrigeration and sedimentation, consisting of a receptacle to contain the liquid to be frozen, means for introducing the desired quantity of liquid into said receptacle, controllable means for refrigerating said receptacle and contents and maintaining said receptacle at a temperature below the freezing point, means for removing from said receptacle a portion of the unfrozen contents, means exterior to the receptacle for filtering the removed portion of the liquid, means for returning such removed portion to the receptacle after it has been freed of such matter, said means producing an agitation of the liquid within the receptacle, and means for controlling the temperature of the removed portion during the entire period from its removal from the receptacle and its return thereto, so as to maintain the temperature at or below the freezing point.

In testimony that I claim the foregoing as my own, I have hereto affixed my signature in the presence of two witnesses.

ROBERT H. HEMPHILL.

Witnesses:
 FRANK C. WHEAT,
 SAML. LAPHAM.